United States Patent [19]

Spiringer

[11] 3,730,310

[45] May 1, 1973

[54] CURRENT CONDUCTOR RAIL
[75] Inventor: Arthur James Spiringer, Lynchburg, Va.
[73] Assignee: H. K. Porter Company, Inc., Lynchburg, Va.
[22] Filed: Sept. 30, 1971
[21] Appl. No.: 185,100

[52] U.S. Cl..............................191/29 DM, 238/244
[51] Int. Cl. ..............................................B60m 1/30
[58] Field of Search....................174/94 R; 238/259, 238/243, 244; 191/22 R, 22 DM, 29 R, 29 DM, 30, 32

[56] References Cited

UNITED STATES PATENTS

| | | | |
|---|---|---|---|
| 1,620,496 | 3/1927 | Spieckermann | 191/29 DM |
| 320,641 | 6/1885 | Davies | 238/259 |
| 2,901,722 | 8/1959 | Arnott | 174/94 R |
| 1,527,053 | 2/1925 | McGinniess | 238/263 |
| 1,606,229 | 11/1926 | Hyle | 238/244 |

Primary Examiner—Gerald M. Forlenza
Assistant Examiner—D. W. Keen
Attorney—Leon Edelson et al.

[57] ABSTRACT

An electrical current conductor rail in the form of a high strength beam of ferrous metal of "H" or "I" transverse cross-section providing longitudinally extending outwardly presenting channels on opposite sides of the beam, one or both of which channels have rigidly secured therein a non-ferrous metal extrusion of high electrical conductivity coextensive in length with that of the beam. The extrusion is provided along its full length with an outwardly presenting protuberance serving as a key for coaction with a complementally shaped splice plate for end to end coupling of a pair of such rails. Additionally the body of each extrusion is so shaped relatively to its supporting beam that when secured to the latter the central portion thereof coextensive with said protuberance may be sprung toward the central web of the beam to insure maximum electrical contact between the engaging surfaces of the beam and its extrusion.

6 Claims, 5 Drawing Figures

Patented May 1, 1973  3,730,310
2 Sheets-Sheet 1
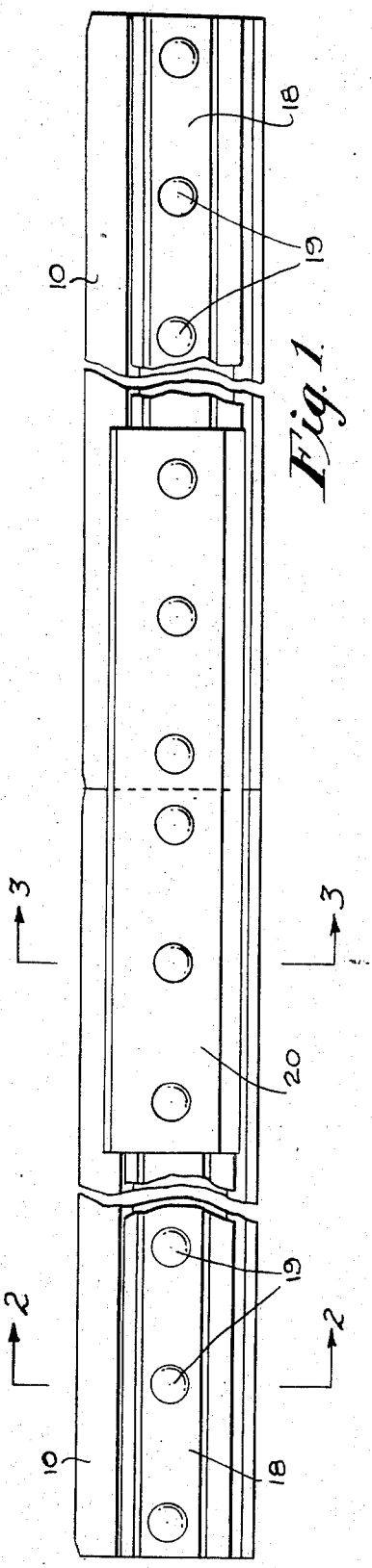
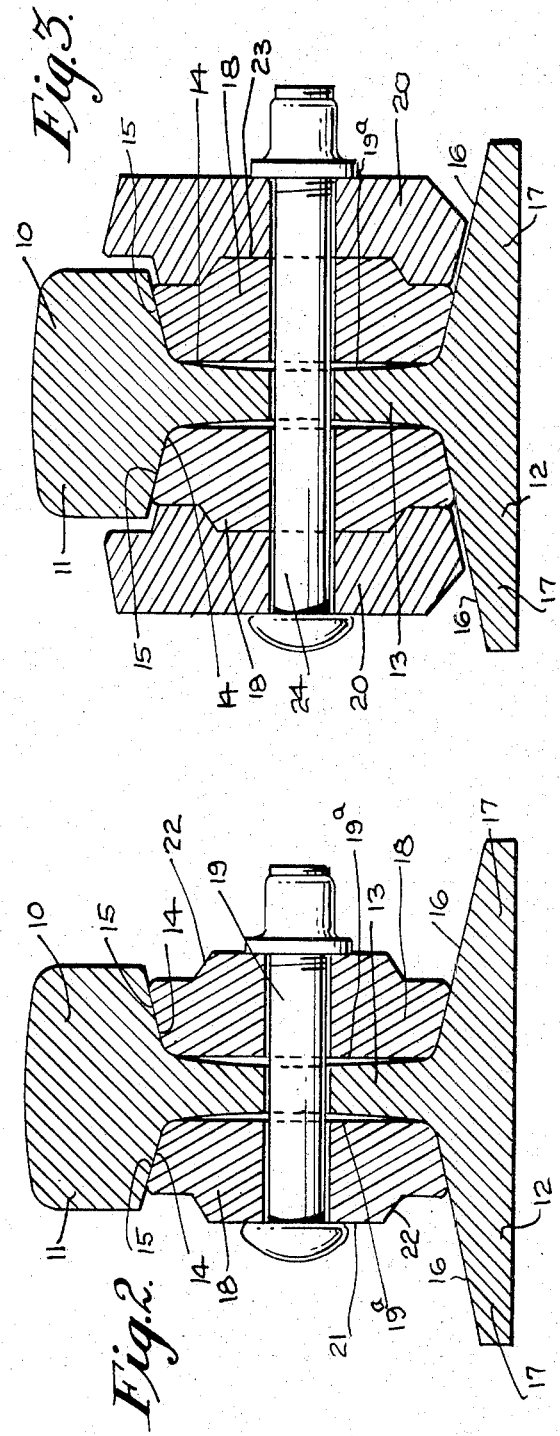
INVENTOR
ARTHUR JAMES SPIRINGER
BY
Edelson and Odell
ATTORNEYS Patented May 1, 1973 3,730,310

INVENTOR
ARTHUR JAMES SPIRINGER
BY Edelson and Udell
ATTORNEYS 3,730,310

CURRENT CONDUCTOR RAIL

This invention relates generally to conductor rail systems used to provide a constant source of electric power to movable work utilities and more particularly to improvements in the construction of conductor rails which are of high strength and rigidity and are highly resistant to wear and which also provide the electrical conductivity necessary to carry the system's amperage capacity without the use of booster cables.

There are presently in use current conducting systems made up of rails, such as steel railroad rails, which are spliced together in end to end relation to provide a conductor of the desired overall length. While such conductor rails, formed generally of steel or other ferrous metal, have the strength and rigidity to meet their operational life expectancy, they have limited current carrying capacity and thus require for increased capacity the attachment of booster cables made of copper, aluminum or other such materials having the requisite electrical conductivity. These current booster cables are expensive not only from the standpoint of material cost but also from that of the labor required to attach the same to the steel rail.

Various attempts have been made to overcome the disadvantages and expense inherent in the use of booster cables to increase the current carrying capacity of conductors made of ferrous metal, such as the provision of composite rails having an upper part of steel fitted into a base part of aluminum, but these have imposed difficulties in use because of dimensional differentials between such composite rails and existing rails. Also, such rails have proved to be of substantially increased cost because of the need to employ therein substantially more aluminum (or copper) than is actually required in order to meet the height, strength and rigidity requirements of the conductor rail for satisfactory use in the conductor rail system.

It is among the principal objectives of the present invention to overcome the problems usually associated with composite rails of bimetallic construction by providing a steel rail of more or less conventional form as now employed as a current conductor with one or more extrusions of aluminum, copper or other metal having good electrical conductivity so secured to the rail as to become in effect an integral part thereof.

It is a further object of the invention to provide an extrusion of non-ferrous metal having high electrical conductivity, such as aluminum or copper, which is so shaped and of such design that the same may be rigidly secured to one or both sides of the central web of a standard construction of steel rail having the usual "H" or "I" configuration and thereby increase the current carrying capacity of the rail.

The present invention is applicable not only to newly fabricated standard steel rails of "H" or "I" configuration, but also to constructions of such steel rails present in existing installations of current conducting systems and thus it is a further object of the present invention to provide a means for effectively converting in situ a standard steel rail of conventional "H" or "I" configuration having limited electrical conductivity into a composite rail having integrated therewith the aforesaid more highly conductive non-ferrous extrusions without altering the basic construction of the rail or requiring its removal from the current conducting system for attachment thereto of said extrusions.

Other objects and advantages of the present invention will appear more fully hereinafter, it being understood that the present invention consists substantially in the combination, construction, location and general arrangement of parts as hereinafter described in detail, as shown in the accompanying drawings and as finally pointed out in the appended claims.

In the accompanying drawings:

FIG. 1 is a side elevational view showing a plurality end to end alined and spliced-together current conductor rails constructed in accordance with and embodying the principles of the present invention;

FIG. 2 is a transverse sectional view of a rail as taken along the line 2—2 of FIG. 1;

FIG. 3 is a transverse sectional view of the rail and its splice plates as taken along the line 3—3 of FIG. 1;

Figure 4:
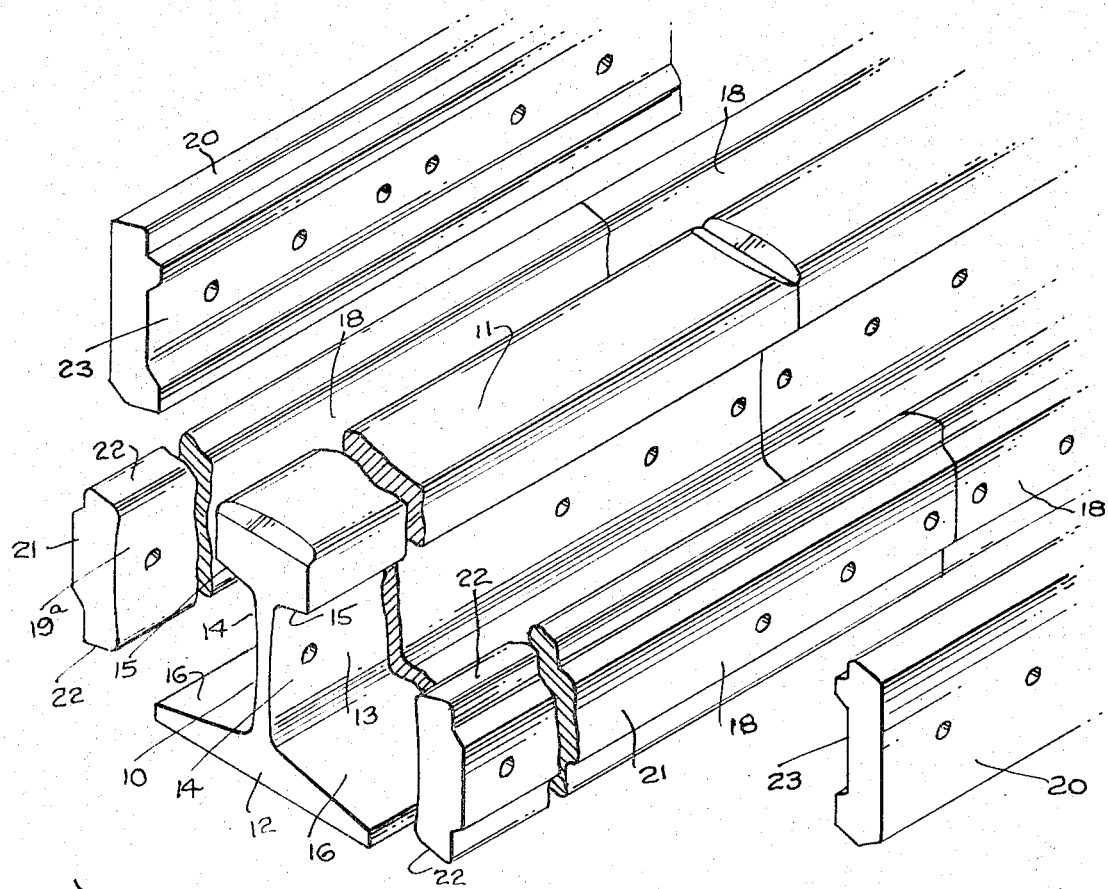
FIG. 4 is an exploded elevation view of a pair of rails and the splice plates for joining the same together.
Figure 5:
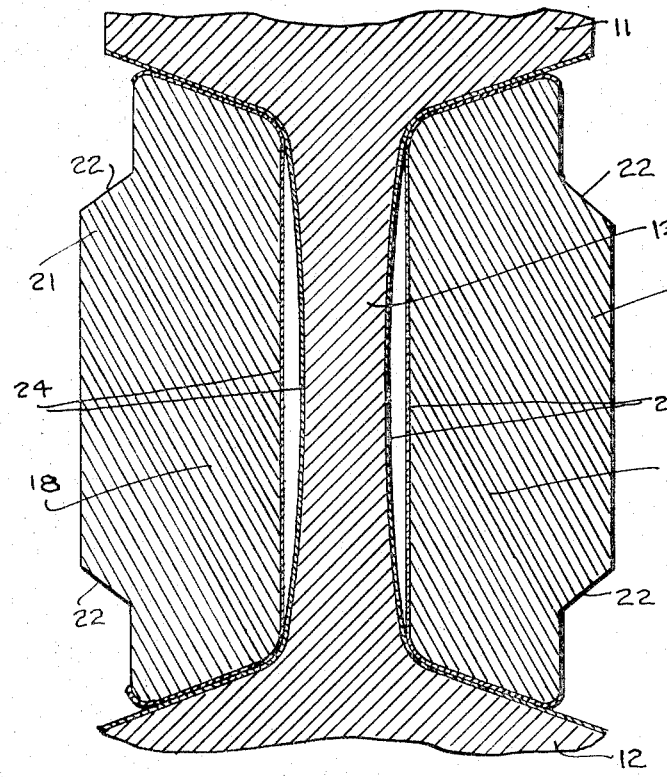
FIG. 5 is a fragmentary enlarged transverse sectional view of the rail showing the interfacial coating of an oxide inhibiting and rust preventing applied between the steel rail and its side secured extrusions.

Referring now more particularly to the drawings, it will be observed that the conductor rail of the present invention includes as its basic structural element a main beam part 10 of "H" or "I" transverse cross-section having a head 11 and a base 12 integrally connected together by an intervening central web 13 to provide the beam with opposite, outwardly presenting side channels 14—14, as see FIG. 4. This beam, made of electrically conductive steel or other ferrous metal, is thus one of a more or less standard rail construction which may be present in an existing current conducting system in which the top surface of the head 11 is engaged by the current collector (not shown) for supplying current to the work utility as it moves along the current conducting rail. Alternatively, the basic steel beams may be newly constructed to match in transverse section the rails of any existing system not only for use as replacements for one or more of such existing rails or as extensions of the system but also for installation as parts of a newly constructed current conducting system.

The beam 10 is characterized by the fact that the under surfaces 15—15 of the head part 10 extending laterally outward from opposite sides of the central web part 13 are each upwardly and outwardly inclined (when viewed with the central web disposed in vertically extending position) and that the top surfaces 16—16 of the laterally extending flange parts 17—17 of the base 12 are each downwardly and outwardly inclined, thereby providing each of the oppositely presenting side channels 14—14 of the rail with outwardly divergent top and bottom walls.

Adapted to be secured in each of these side channels of the rail in accordance with the present invention is an extrusion 18 formed of metal having a high electrical conductivity, such as aluminum or copper, which extrusion is of a length coextensive with that of the steel beam to which it is secured. The extrusion 18 may be applied to one or both sides of the steel beam and is so securely keyed to the beam as to in effect become an integral part thereof and thus increase the current carrying capability of the composite rail considered as a whole.

To this end, the extrusions 18 are each of generally trapezoidal shape in transverse cross-section, the opposite longitudinally extending edges thereof being tapered in correspondence with the tapers of the outwardly divergent top and bottom walls of each of the side channels 14—14 provided at opposite sides of the beam 10.

The extrusions 18 are rigidly and permanently keyed to the steel beam 10, either to one side or to both sides thereof as may be desired, by any suitable means, as by plug welds, rivets threaded bolts, explosively installed pins or pins with swage lock collars commercially available as "Huckbolts" manufactured by Huck Manufacturing Company. The drawings show these last mentioned "Huckbolts" as the securing means, which bolts 19 extend through registering apertures provided in the beam central web 13 and in the extrusions 18 at uniformly spaced intervals along the length of the extrusion-reinforced composite rail.

Preferably, the inner face 19a of the extrusion 18, i.e., the surface which mates with the central web of the beam 10, is shaped to provide a gap between it and the face of the web when the extrusion is initially nested in its accomodating side channel of the beam, so that when the extrusion is securely fastened in position it may be sprung inwardly toward the central web of the beam and thus secure maximum contact between the interfitted extrusion or extrusions and the beam to which they are applied, especially in the corner regions of their fit and along their longitudinally extending tapered surfaces. To obtain to the maximum this spring action effect, the inner surface of the extrusion 18 may be inwardly curve, as best shown in FIG. 4. However, substantially this same spring action may be obtained even without any curvature in the inner face of the extrusion when it is applied to a rail wherein the opposite faces of its central web are themselves inwardly curved as see FIG. 2, to provide the aforesaid gap between the mating faces of the extrusions and said central web.

The extrusions 18 are of such substantial thickness that they serve not only to measurably increase the current carrying capacity of the steel beams to which they are applied but also to furnish increased strength and rigidity to the beams. In addition, it has been found that due to the interfacial configuration of these extrusions and the steel beams any irregularities in the rails are straightened out upon application thereto of the extrusions and thus successive beams are rendered more readily alinable for end to end coupling of the composite rails by the splice plates 20 shown in FIGS. 1, 2 and 3.

It will be noted that the extrusions 18 are each centrally provided in its outer face with a longitudinally extending protuberance 21 of generally trapezoidal form to provide the same with oppositely bevelled longitudinally extending edges 22—22. The splice plates 20 employed to overlie and join together the end portions of end to end alined rails have their inner faces each longitudinally recessed, as at 23, to snugly receive the outwardly extending protuberances 21 of the extrusions. These recesses 23 are of such complemental shape with respect to the shape of the extrusion protuberances 21 as to insure close fitting relation between each extrusion and its interfitted splice plate so that when such plates are securely tightened together to clamp together the adjoining ends of a pair of rails to be coupled together, a secure and effective splice joint is obtained. The splice plates are secured in their rail coupling condition by compression bolts 24 similar to the aforementioned "Huckbolts" extending through apertures formed in the plates in registry with the holes extending through the steel beam web and the extrusions applied thereto.

In order to insure the maintenance of maximum effective electrical contact between the steel beam and its higher electrically conductive extrusion secured thereto, the mating and in particular the contacting surfaces of the steel beam and the extrusion are coated with an oxide inhibiting compound 24, such as that commercially available as "No-Ox-Id" manufactured by Dearborn Chemical Division, W.R. Grace Company. It will be understood, of course, that any suitable oxide-inhibiting and/or rust preventing compound may be employed to insure an effective and permanent electrically conductive bond between the steel beam and the extrusion or extrusions secured thereto.

In such case where, as has been previously indicated, a single extrusion 18 is applied to only one side of the steel beam 10, a pair of such rails may be effectively spliced by utilizing a single splice plate applied to the extrusion side of the rail and held in place by compression bolts having their heads in direct engagement with the opposite side of the rail. However, a short section of an extrusion 18 may be employed as the second splice where conditions might require the use of a pair of splice plates for coupling together the end portions of a pair of composite rails each of which includes only one extrusion running the full length of the main steel beam 10. In this latter case, of course, the compression bolt heads would engage the extrusion section employed as a splice plate.

Having now described the present invention, it will be understood that modifications and variations thereof may be made from time to time without departing from the essential principles or real spirit of the invention and accordingly it is intended to claim the same broadly as well as specifically as indicated by the appended claims.

What is claimed as new and useful is:

1. In a current conducting rail system for supplying electrical energy to electrically energizable movable utilities having current collecting devices movable along the rails of said system, in combination, I. a plurality of endwise alined current conductor rails mechanically and electrically secured together in closely coupled relation, each of said rails comprising
  a. a main beam of generally I-shaped transverse cross-section formed of electrically conductive ferrous metal having on each of its opposite sides an outwardly presenting channel extending the full length of said main beam, each of said channels having a base wall formed by the central web and a pair of outwardly diverging side walls formed by the top and bottom flanges of said main beam, and
  b. an elongated auxiliary beam of non-ferrous metal having high electrical conductivity disposed in at least one side channel of said main beam, said auxiliary beam being of generally trapezoidal transverse cross-section having a pair of top and bottom sides which diverge outwardly from the inner side of said auxiliary beam to form inner corner edges which respectively nest in the corners of said main beam channel to provide, while said auxiliary beam is in its relaxed condition, an interfacial gap between the base wall of said channel and said inner side of the auxiliary beam disposed in said channel, said auxiliary beam being provided along its outer side with an outwardly projecting elongated integral keying rib having upper and lower outwardly converging edges, said rib extending the full length of the auxiliary beam in substantially centrally spaced relation between the outer edges of said top and bottom outwardly diverging sides of said auxiliary beam to serve as a key for attachment thereto of a splice plate for end to end accurately alined coupling of successive pairs of said rails, II. a splice plate commonly keyed to the outwardly projecting keying ribs of each successive pair of said auxiliary beams for mechanically and electrically coupling the same together in end to end alinement thereof, each said aplice plate having a main body portion provided with vertically spaced longitudinally extending upper and lower inwardly projecting ribs to provide therebetween a recess for commonly accomodating therein adjoining rib portions of said alined auxiliary beams, said splice plate ribs being so dimensioned as to maintain said main body portion of said splice plate and the outer edges of its vertically spaced ribs free from engagement with said main beams of said coupled composite rails, and III. means for compressively forcing said auxiliary beam and said splice plate into their fully seated positions whereby the body portions of said auxiliary beam intermediate its longitudinally extending outwardly diverging top and bottom sides is sprung inwardly toward the web of said main beam within the permissible limits of said gap and thereby simultaneously tightly wedge and secure said corners and top and bottom sides of said auxiliary beam into intimate surface engagement with the corners and outwardly diverging side walls of said channel.

2. A current conductor rail system as defined in claim 1 wherein both of the outwardly presenting channels of said ferrous metal main beam are each fitted with an auxiliary beam as aforesaid.

3. A current conductor rail system as defined in claim 1 wherein said compressive means consist of individual securing elements which rigidly unite said non-ferrous auxiliary beam to said main beam at a plurality of points spaced along the full length thereof as well as clamp said splice plate in rail-coupling position.

4. A current conductor rail system as defined in claim 1 wherein said main beam of ferrous metal constitutes an existing part of a current conducting system and said auxiliary beam is attached thereto in situ.

5. A current conductor rail system as defined in claim 1 wherein said auxiliary beam of non-ferrous metal is coextensive in length with that of said main beam of ferrous metal.

6. A current conductor rail system as defined in claim 1 wherein, when one of said non-ferrous auxiliary beams is secured to one side only of said ferrous main beam for the full length thereof to form one of a pair of composite rails to be coupled together in end to end alinement, the splice plate commonly keyed to the outwardly projecting keying ribs of said pair of alined rails is supplemented on the opposite side of said rails with a relatively short section of a separate length of said non-ferrous auxiliary beam to provide a second splice plate which coacts with said keyed-in-place splice plate to clampingly engage opposite sides of the coupled pair of composite rails.

* * * * *

UNITED STATES PATENT AND TRADEMARK OFFICE
Certificate
Patent No. 3,730,310                                Patented May 1, 1973
                    Arthur James Spiringer Application having been made by Arthur James Spiringer, the inventor named in the patent above identified, and H. K. Porter Company, Inc., Lynchburg, Va., a corp. of Delaware, the assignee, for the issuance of a certificate under the provisions of Title 35, Section 256, of the United States Code, adding the names of Richard E. Lillard and William M. Cope as joint inventors, and a showing and proof of facts satisfying the requirements of the said section having been submitted, it is this 4th day of November 1980, certified that the names of the said Richard E. Lillard and William M. Cope are hereby added to the said patent as joint inventors with the said Arthur James Spiringer.

FRED W. SHERLING,
*Associate Solicitor.*